May 23, 1950     W. KASTEN     2,509,151
PRESSURE-SEALING MEANS
Filed May 10, 1945     2 Sheets-Sheet 1
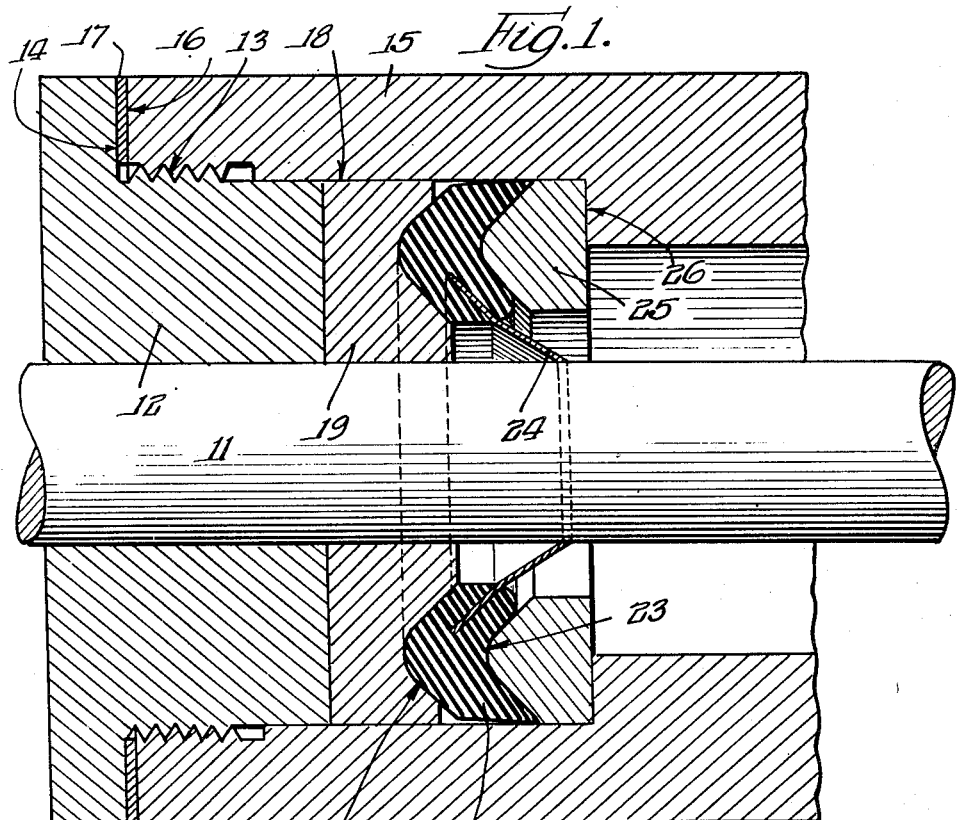
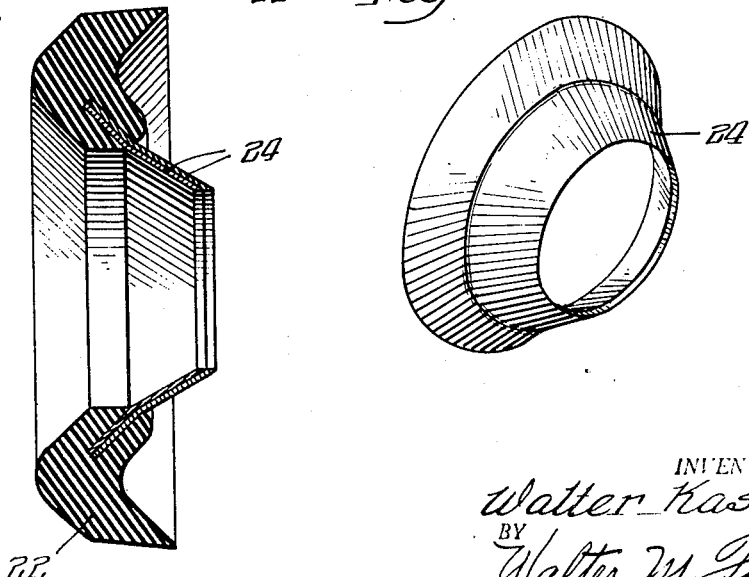
INVENTOR.
Walter Kasten
BY Walter M. Fuller
Atty.

May 23, 1950 W. KASTEN 2,509,151
PRESSURE-SEALING MEANS
Filed May 10, 1945 2 Sheets-Sheet 2
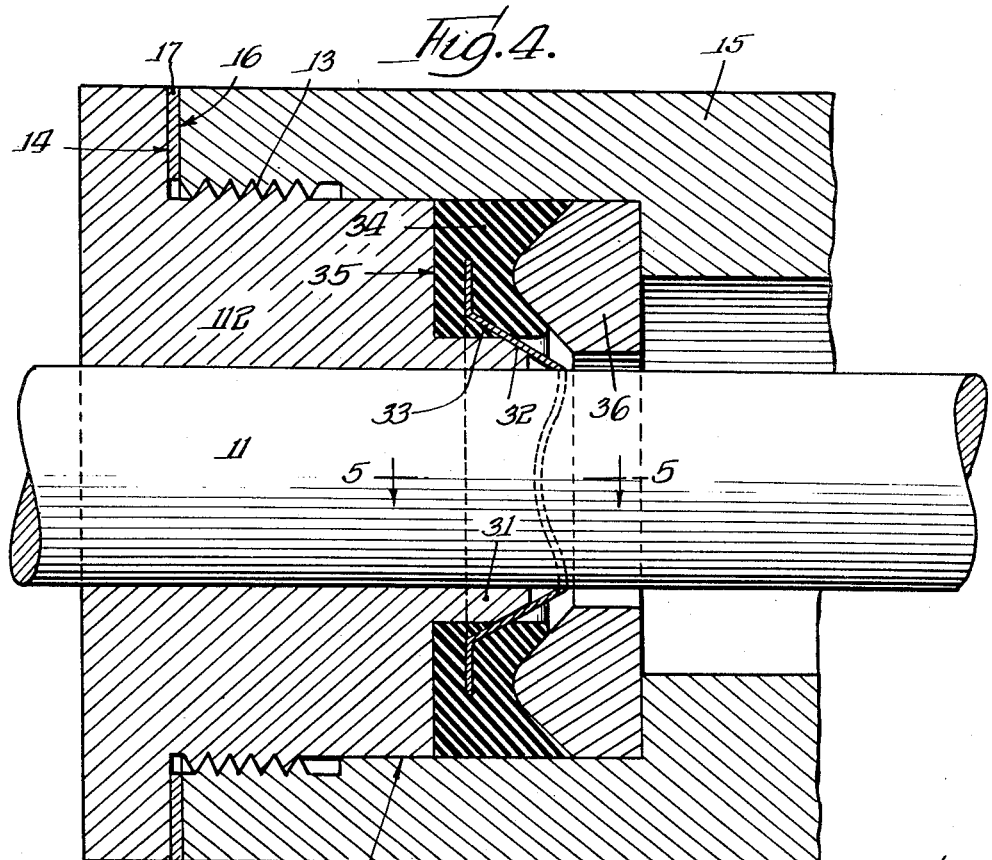
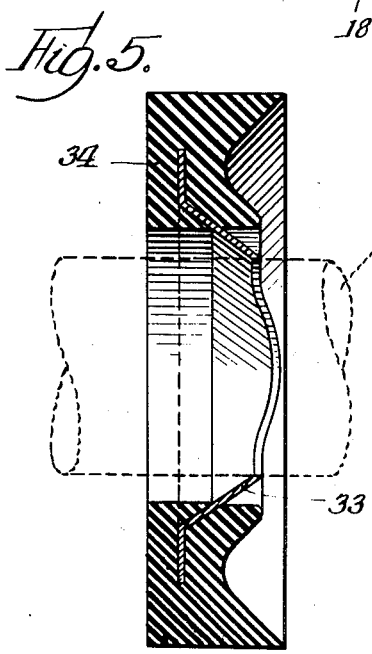
INVENTOR.
Walter Kasten
BY
Walter M. Fuller Patented May 23, 1950

2,509,151

UNITED STATES PATENT OFFICE 2,509,151

PRESSURE-SEALING MEANS

Walter Kasten, Franklin, Mich., assignor to Renniks Company, Detroit, Mich., a copartnership Application May 10, 1945, Serial No. 593,085

3 Claims. (Cl. 288—5)

The present invention concerns novel and innovatory structural features and functional properties and characteristics in glands or pressure-sealing means for relatively rotary-members, such as shafts and their bearings, although the invention in its broader aspects is not necessarily limited to such specific employment.

One aim of the invention is to provide a sealing means of the type indicated which is flexibly or resiliently mounted thus facilitating its application in place and affording a minor movement allowing it to conform readily to slight irregularities in structure and in action.

A further object of the invention is to increase the area of edge contact of the sealing agent with the rotary element.

An additional purpose of the invention is to supply a seal of this character which is simple in structure, which is economical to manufacture, which provides long and efficient utilization of its valuable functioning properties, and which is unlikely to become damaged or injured in ordinary service.

A leading purpose of the combination synthetic molded reed chevron seal is to provide more flexibility thus allowing for greater misalignment of the shaft relative to the bore of the housing and it also affords a more economical construction of the reed.

In the case of very small diameter seals it becomes quite difficult to provide sufficient wall thickness for a metal retainer for the reed and at the same time assure a perfect pressure-tight seal at the place where the one or more reeds are clamped by the metal retainers.

In accordance with the new invention this difficulty is avoided by molding the one or more reeds directly in an elastomeric material, the latter at the same time being capable of use as a static seal and in this way the retainer can be shaped in such a manner as to provide a static seal in the form of an O-ring, chevron ring or cup-type seal.

In the past, it has been found that, in order to stay within the stress limits of the reed, only a certain definite amount of interference fit could be allowed for a given diameter of reed which meant that the mating shaft would have to be machined to rather close limits in order not to exceed the stress limitations of the reed.

To overcome this restriction the active edge of the reed can be scalloped out in such a manner that the contact surface between the shaft and the reed does not represent a true circle.

In order to maintain the intimate contact of such a reed edge and the shaft, the angle of the circular reed changes around its circumference but the angle of the reed at any two points diametrically opposite is of the same value.

Obviously the total length of the wavy edge of the reed will be of greater value than the circumference of the shaft, this being dependent upon the extent or depth of the surface.

This makes it possible to use a much greater amount of interference fit for a given stress in the reed edge because of the added length of the edge which results in greater resiliency.

To permit those acquainted with this art to understand this invention, both from structural and operative standpoints, present preferred embodiments thereof have been illustrated in the accompanying drawings, forming a part of this specification, and to which reference should be had in connection with the following detailed description.

For simplicity, like reference numerals have been employed throughout the several views of the drawings to designate the same structural parts.

In these drawings—

Figure 1 is a longitudinal sectional view of one form of the pressure-sealing means;

Figure 2 is a perspective view of the reed forming part of the novel gland;

Figure 3 is a central section through the sealing element itself illustrating a device of this kind employing a plurality of nested conical reeds;

Figure 4 is a view similar to that of Figure 1 presenting a modified and improved style of the structure;

Figure 5 is a fragmentary section on line 5—5 of Figure 4 showing the sealing means only;

Figure 6 is a section on an enlarged scale illustrating the metallic reed of Figures 4 and 5; and Figure 7 presents a seal of the type portrayed in Figures 4, 5 and 6 but incorporating a plurality of interfitted reeds.

Referring initially to the form of pressure-sealing means shown in Figures 1 and 2, it will be observed that the cylindrical shaft 11 is mounted for rotation or reciprocation or oscillation in a bearing-member 12 having a reduced-diameter, externally-screwthreaded portion 13 and an adjacent, circular shoulder 14.

Screwed on such lesser part 13 is a hollow member 15 fitted with a ring-gasket 17 between its end 16 and the shoulder 14, the cylindrical chamber 18 of such element 15 snugly accommodating a ring 19 through which the shaft 11 extends, one face of such ring having a circular groove 21 of the shape in cross-section depicted in Figure 1 and housing the similarly-shaped portion of a rubber, neoprene, or other suitable elastomeric ring 22 circularly concave at 23 on its opposite face.

As will be apparent, instead of employing a separate ring 19 it may form an integral part of member 12.

Embedded and retained in the inner portion of such ring 22 is the larger part only of a tapered or convergent, circular, thin reed 24 of metal, alloy, or other suitable material, extending inwardly to, and bearing edgewise in sealing engagement with, the adjacent cylindrical surface of the shaft as is clearly portrayed.

Such flexible reed 24 and its elastic mounting member 22 are maintained firmly in operative relation with shaft 11 by another confining ring 25 shaped convexedly on one face 23 to occupy and conform to the adjacent or proximate concave surface of ring 22, such member being held in place by its opposite flat surface pressing against the plane, internal, circular shoulder 26 of member 15.

From what precedes, it will be clear that the resilient or elastic member 22 is firmly and efficiently held in place, but without entirely nullifying its elastic properties, thus allowing the reed to modify its position slightly to bear edgewise always effectively around the entire circumference of the shaft thus automatically compensating for any slight irregularities in the rotundity of the shaft or in the rotation of the shaft about its axis.

This elastic round element 22 may also act as a static seal in engagement with the cylindrical wall of chamber 18, the element 25 tending to expand the part 22 into such engagement.

The smaller inner edge of the reed in pressure-sealing contact with the shaft, if desired or necessary, may be preliminarily ground, or ground and lapped, to provide the edge of proper caliber ordinarily slightly less than the diameter of the shaft and with the surface of the edge parallel to the axis of the shaft when in engagement therewith, or, stated somewhat otherwise, if desired, the diameter of the opening through the reed may be slightly less than the diameter of the shaft before the parts are assembled so that the edge of the reed is in efficient contact with the shaft which pressure may be augmented by the fluid pressure in the appliance acting on the obtuse-angle face of the reed which usually engages the shaft with its small angle about 30°.

It is to be noted from the drawing that the rubber or comparable mounting 22 is rounded at its inner edge providing for greater available resiliency thereof than would be true did such edge terminate in a flat surface located directly between the two confining members 19 and 25.

As has been mentioned above, when such a sealing structure is employed for the shaft of a pressure creating or containing appliance, such fluid pressure acting on the exterior surface of the exposed portion of the reed tends to force it into firmer contact with the shaft and to maintain it efficiently in that relation, thus precluding the escape or discharge past it of any of the pressure agent and for the accomplishment of this desirable object, as has been illustrated, the parts 25 and 22 are of larger internal diameter than the external diameter of the shaft.

Ordinarily the reed engages the shaft at approximately 30° or 45° but this, of course, is subject to more or less radical modification.

Inasmuch as this reed is mounted in the elastic or resilient member 22 the reed can shift its position slightly to conform to any lack of exact cylindricity of the shaft or to any slight wabble of the shaft.

In those cases requiring more than one reed a plurality thereof in nested contacting relation may be used and all mounted in the same rubber or neoprene member as portrayed in Figure 3.

Referring to Figures 4, 5, 6 and 7, it will be observed that an improved form of the sealing means has been presented.

In this instance, the parts 11, 13, 14, 15, 16 and 17 may be substantially the same as those dealt with hereinabove, but, in this case the bearing 112 is prolonged at lesser diameter at 31 with its terminal portion externally sloping at 32 thus providing a tapered shoulder against which a portion of the thin, circular, tapered reed 33 may bear to back up or reinforce the reed and to preclude any buckling thereof, the outstanding rim of the reed being embedded in a rubber or other suitable resilient supporting ring 34 snugly accommodating the extension 31 through it and having a smooth plain back surface bearing against the proximate circular projection 35.

As in the previous instance, the holding ring 36 is substantially like that designated 25 in Figure 1 and performs analogous functions.

Aside from the bearing of the reed 33 on the ridge 32, the only other outstanding difference in this form of construction is the fact that the active inner edge of the reed, instead of being in one transverse plane, is of wave form, as shown, to increase the area of contact of the reed on the shaft during the rotation of the latter and to afford such edge of the reed greater flexibility.

Because of this curved edge of the reed in proper and effective engagement entirely around the shaft the body of the reed is not exactly circular, the shorter length portions of the reed being somewhat inwardly deflected and at a slightly greater degree of slope, as illustrated perhaps most clearly in Figure 6.

As in the previous instance, instead of a single reed being used a plurality of nested reeds may be employed, as illustrated in Figure 7.

The reed 33 of Figure 4 could be employed in a mounting of the type presented in Figure 1, or the reed of Figure 1 could be used with the mounting as depicted in Figure 4.

It will, of course, be understood that either the shaft or the bearing may revolve or reciprocate or oscillate with relation to the other and the sealing means be entirely effective and operative satisfactorily in either instance, or the sealing means may be mounted on the shaft and have its edge engagement with a portion of the bearing or other member of larger diameter than the shaft.

From an understanding of these constructions the manner of accomplishment of the various objects of the invention stated above will be readily understood without repeating them.

The invention as defined in the appended claims is not necessarily limited to the exact and precise details of structure and function set forth and reasonable modifications may be resorted to without departure from the principles of the invention and without the loss of any of its substantial benefits.

For example, in some instances it may be desirable to employ this type of sealing means in which the parts instead of rotating relatively to one another reciprocate with relation to one another.

I claim:

1. A pressure seal comprising an outer annular mounting of elastometric material having an inner annular surface, and an inner annular frusto-conical sealing reed disposed within said mounting, the outer marginal portion of said reed penetrating the inner annular surface of the mounting and embedded therein, the inner marginal portion of the reed projecting radially inwardly and obliquely from the mounting for edgewise engagement with a surface to be sealed.

2. A pressure seal comprising a thin annular frusto-conical sealing reed, and an annular mounting of elastomeric material surrounding and embedding therein the outer marginal portion only of said reed, the inner marginal portion of said reed projecting radially inwardly and obliquely from said mounting, whereby the projecting portion of the reed is exposed to pressures at the joint being sealed and whereby the resilient mounting for the reed permits the latter to shift under external pressures and to thus adapt itself to its environment.

3. A pressure seal comprising an annular mounting of elastomeric material, and a thin annular frusto-conical sealing reed arranged with the outer marginal portion only thereof embedded in said mounting, the inner annular marginal portion of said reed projecting radially inwardly and obliquely from said mounting and having a beveled edge adapted for edgewise engagement with a part to be sealed.

WALTER KASTEN.

REFERENCES CITED

The following references are of record in the file of this patent:

UNITED STATES PATENTS

| Number | Name | Date |
| --- | --- | --- |
| 1,200,966 | Minning | Oct. 10, 1916 |
| 1,788,414 | Stevenson | Jan. 13, 1931 |
| 1,882,223 | Lorehn | Oct. 11, 1932 |
| 2,226,273 | Westefeldt | Dec. 24, 1940 |
| 2,372,907 | Mercier | Apr. 3, 1945 |

FOREIGN PATENTS

| Number | Country | Date |
| --- | --- | --- |
| 202,475 | Great Britain | of 1923 |